United States Patent
Arrowood

(10) Patent No.: US 8,943,594 B1
(45) Date of Patent: Jan. 27, 2015

(54) CYBER ATTACK DISRUPTION THROUGH MULTIPLE DETONATIONS OF RECEIVED PAYLOADS

(71) Applicant: Haystack Security LLC, Tulsa, OK (US)

(72) Inventor: James Lee Wayne Arrowood, Tulsa, OK (US)

(73) Assignee: Haystack Security LLC, Tulsa, OK (US)

( * ) Notice: Subject to any disclaimer, the term of this patent is extended or adjusted under 35 U.S.C. 154(b) by 0 days.

(21) Appl. No.: 14/132,824

(22) Filed: Dec. 18, 2013

Related U.S. Application Data

(60) Provisional application No. 61/838,758, filed on Jun. 24, 2013.

(51) Int. Cl.
*G06F 12/14* (2006.01)
*G06F 21/53* (2013.01)

(52) U.S. Cl.
CPC ..................................... *G06F 21/53* (2013.01)
USPC .......................................................... 726/23

(58) Field of Classification Search
CPC .......................... G06F 21/53; G06F 2221/2149
USPC .......................................................... 726/23
See application file for complete search history.

(56) References Cited

U.S. PATENT DOCUMENTS

| | | | |
|---|---|---|---|
| 6,732,180 B1 | 5/2004 | Hale et al. | |
| 7,356,736 B2 | 4/2008 | Natvig | |
| 7,571,482 B2 | 8/2009 | Polyakov et al. | |
| 7,594,111 B2 * | 9/2009 | Kiriansky et al. | 713/166 |
| 7,757,282 B2 | 7/2010 | Pandit et al. | |
| 7,996,901 B2 | 8/2011 | O'Sullivan et al. | |
| 8,224,796 B1 | 7/2012 | Shinde et al. | |
| 8,365,297 B1 | 1/2013 | Parshin et al. | |
| 2002/0118644 A1 | 8/2002 | Moir | |
| 2004/0168173 A1 * | 8/2004 | Cohen et al. | 719/310 |
| 2006/0161982 A1 | 7/2006 | Chari et al. | |
| 2008/0005782 A1 | 1/2008 | Aziz | |
| 2008/0016570 A1 | 1/2008 | Capalik | |
| 2008/0133540 A1 | 6/2008 | Hubbard et al. | |
| 2008/0201129 A1 | 8/2008 | Natvig | |
| 2008/0222729 A1 | 9/2008 | Chen et al. | |
| 2009/0094697 A1 | 4/2009 | Provos et al. | |
| 2009/0158430 A1 | 6/2009 | Borders | |
| 2009/0208910 A1 | 8/2009 | Brueckner et al. | |
| 2010/0115621 A1 | 5/2010 | Staniford et al. | |
| 2010/0146615 A1 | 6/2010 | Locasto et al. | |
| 2010/0217801 A1 | 8/2010 | Leighton et al. | |
| 2011/0078794 A1 | 3/2011 | Manni et al. | |
| 2011/0083180 A1 | 4/2011 | Mashevsky et al. | |

(Continued)

FOREIGN PATENT DOCUMENTS

WO   2005/048522 A1   5/2005

*Primary Examiner* — Peter Shaw
(74) *Attorney, Agent, or Firm* — Hall Estill Attorneys at Law

(57) ABSTRACT

Apparatus and method for disrupting cyber attacks. In accordance with some embodiments, the apparatus includes a local computer system and an associated security system. The security system employs a decoy environment operationally isolated from the local computer system. The decoy environment operates to, responsive to receipt of a payload from an outside source, load the received payload into a memory of the decoy environment and detonate the loaded payload a plurality of times.

27 Claims, 4 Drawing Sheets

(56) References Cited

U.S. PATENT DOCUMENTS

| | | |
|---|---|---|
| 2011/0099633 A1 | 4/2011 | Aziz |
| 2011/0147072 A1 | 6/2011 | Yamashita et al. |
| 2011/0219448 A1 | 9/2011 | Sreedharan et al. |
| 2011/0276699 A1 | 11/2011 | Pedersen |
| 2012/0304287 A1 | 11/2012 | Yu et al. |

* cited by examiner

CYBER ATTACK DISRUPTION THROUGH MULTIPLE DETONATIONS OF RECEIVED PAYLOADS

RELATED APPLICATIONS

The present application makes a claim of domestic priority under 35 U.S.C. §119(e) to U.S. Provisional Patent Application No. 61/838,758 filed Jun. 24, 2013, the contents of which are hereby incorporated by reference.

SUMMARY

Various embodiments of the present disclosure are generally directed to cyber security systems, and more particularly to a method and apparatus for disrupting a cyber attack on a networked computer system.

In accordance with some embodiments, the apparatus includes a local computer system and an associated security system. The security system employs a decoy environment operationally isolated from the local computer system. The decoy environment operates to, responsive to receipt of a payload from an outside source, load the received payload into a memory of the decoy environment and detonate the loaded payload a plurality of times.

DETAILED DESCRIPTION

Figure 1:
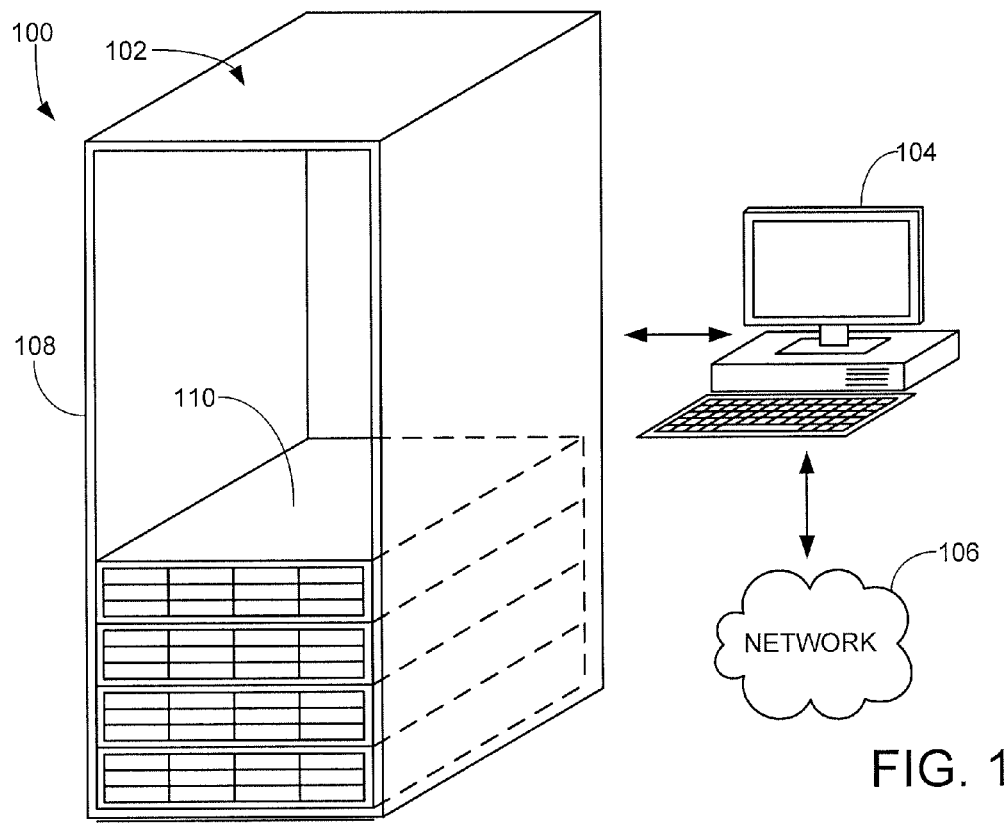
FIG. 1 is a functional representation of a networked local computer system in accordance with some embodiments of the present disclosure.

The present disclosure generally relates to networked computer systems, and more particularly to a method and apparatus for disrupting a cyber attack from an attacking party upon a networked local computer system by generating and forwarding multiple decoy callback communications to the attacking party.

Almost every organization in the industrialized world has one or more local computer systems that communicate with other computer systems via one or more networks, such as local area networks (LANs), wide area networks (WANs), the Internet, etc. Network (cyber) communications take place in a variety of ways such as via email servers, web browsers, video teleconferencing systems, etc.

Modern cyber systems provide unprecedented levels of connectivity and productivity for individuals and organizations throughout the world. Unfortunately, such systems are increasingly vulnerable to efforts by unscrupulous attackers to wreak havoc for political, financial or criminal reasons. Cyber attacks can employ network communication systems to gain entry to local computer systems to carry out surveillance, espionage, data piracy, data corruption and other malicious acts. In some cases, the attackers may be at the state level and represent a significant national security and/or infrastructure threat.

Some cyber security approaches endeavor to protect a local computer system from malicious attacks by characterizing (e.g., "fingerprinting") previous known attacks and endeavoring to identify new attacks based on a scan of incoming communications for such fingerprints. Anti-viral software is an example of this approach.

Other approaches endeavor to prevent the local computer system from accepting communications from known "bad" sites ("blacklisting") or only from known "good" sites ("white listing"). While operable, these and other cyber security approaches are easily circumvented by attackers with a modicum of organization and resources.

Accordingly, various embodiments of the present disclosure are generally directed to an improved cyber security approach that is based on the recognition that malicious payloads are sometimes configured to provide callback communications ("callbacks") to an attacking computer. The callbacks are often passed as one or more small packets that are not normally noticed by system monitoring. The callbacks may provide intelligence to the attacking party regarding system specifications or may establish a backdoor to enable the attacker to come back and extend the attack, etc.

As explained below, some embodiments of the present disclosure provide a networked local computer system having a security controller and a decoy environment, with the decoy environment providing an operational space that is isolated from remaining portions of the local computer system.

Payloads (e.g., network communications, executable code, interpretable code, etc. of a variety of types) are transmitted across the network and received into the decoy environment, where the payloads are processed multiple times, such as by being launched, opened, executed or otherwise activated (collectively, "detonated"). The payloads may be detonated a plurality of times in succession at a time varying rate over an applicable period of time. To the extent that any malicious code is present within the payload, these activation operations may generate numerous decoy callback communications that are sent back to the attacking party.

This serves to flood potential malicious code communications in a "sea of noise," thereby discouraging further probing of the system by the attacking party since legitimate traffic from an actual compromised machine may be difficult if not nearly impossible to locate amongst the decoys.

In one example, an email message may be forwarded to the decoy environment and the email, an attachment thereto, an embedded hyperlink within the email text, etc. is repeatedly detonated multiple times. Should the hyperlink link to a malicious payload, multiple callbacks will be generated by the repeated opening of the hyperlink and forwarded to the attacking party. In another email example, an email attachment may contain a malicious payload. By detonating the payload multiple times, multiple callbacks will be generated and forwarded to the attacking party. The callbacks will not include legitimate information that can be exploited by the attacker.

In another example, a user may use a web browser to visit a particular web page, and the transfer of the web page to the local computer may include a malicious payload as a small amount of JavaScript® or other executable or interpretable code. The decoy environment will emulate the opening of the web page multiple times, again generating multiple callbacks to the attacking party with decoy information from the environment that should not be easily exploitable by the attacking party.

In still another example, a payload in the form of a word processing file (document), an image file, an executable file, an interpretable file, a file in markup language, etc. may be transferred to the local computer system using a variety of mechanisms. As before, a copy of the file will be transferred to the decoy environment and detonated multiple times by an appropriate application or applications within the environment. If the file includes a malicious payload, multiple callbacks may be generated and forwarded to the attacking party, with the callbacks providing decoy information not useful to the attacking party.

In some cases, the decoy environment is a virtual environment or a physical environment that operates in parallel to a normal communication flow through the computer system. For example, payloads may be routed normally to recipients in a large computer system with multiple users, and the users may or may not activate the payloads in due course. Additionally, all payload traffic will be directed to the decoy environment where the payloads are repetitively opened numerous times, such as 10×, 100×, 1000×, etc.

Thus, instead of receiving back a single response, or just a few responses, the attacker will receive a sea of responses, with the authentic callbacks being masked among a significantly larger number of decoy callbacks. The decoy callbacks will appear to be normal callbacks but will include non-useful and/or misleading information about the system. This raises the cost of the attack since the attacker will have to sort through and identify authentic callbacks. The intent is that the attacker will abandon further attempts to gain entry to the system, and will select a different target.

In further embodiments, dummy data files and other objects may be provided in the decoy environment that may be transferred to the attacker (or the attacker may subsequently gain entry and take copies thereof). The dummy data files can mimic an active portion of the local computer system to support a misinformation campaign against the attacker. In some cases, public revelation of the dummy data can help identify attacking paths and/or parties. Consonant with applicable rules and regulations, the dummy files may include malicious payloads that are returned to the attacker, including portions of payloads that are forwarded in different packets and reassembled at the attacking computer.

The decoy environment can take a variety of forms depending on the requirements of the application. The environment may be arranged as a virtual environment or a physical environment. Multiple detonation stages, analogous to multiple local environments, may be used within the larger decoy environment, with each detonation stage detonating the received payload a single time. In some cases, the detonation stages are nominally identical, or can emulate different operational environments such as through the use of different operating systems, different system configurations, different browsers, different email software managers, different system settings, different software applications, different hardware configurations, etc.

These and other features and advantages of various embodiments of the present disclosure can be understood beginning with a review of FIG. 1 which generally depicts a networked local computer system 100. The system 100 includes a mass computing assembly 102 coupled to a computer 104 which in turn is connected to a network 106. The computer 104 can take a variety of forms such as a workstation, a local personal computer, a server, a virtual machine, etc.

The computing assembly 102 in FIG. 1 includes a 42U server cabinet (rack) 108 and a plurality of computing equipment enclosures 110. The enclosures 110 each house a plurality of processing, storage and/or memory devices, such as CPUs, hard disk drives (HDDs) and random access memory (RAM) to provide a large computing environment for the system. Other elements can be readily incorporated into the system 100 as required.

For purposes of the present discussion, the system 100 will be contemplated as comprising a computer system for a moderately sized business entity with several tens or hundreds of users, each having a desktop computer, terminal, workstation or other device which accesses to the system 100 through a LAN 112. It will be appreciated that this is merely to provide a concrete example and the present disclosure is not so limited. Other operational environments are envisioned, including a single local computer, such as but not limited to a home personal computer, tablet, network appliance, smart phone, gaming console, etc. (generally, "network accessible devices"). The computer 104 may in turn communicate with other local devices through a local area network (LAN) or other communication system.

Figure 2:
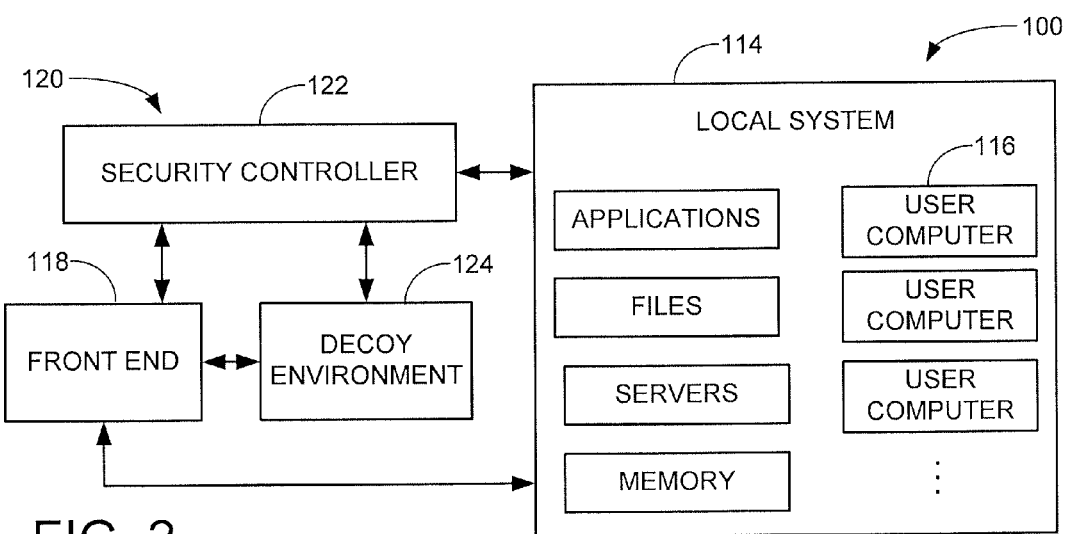
FIG. 2 is a functional block diagram of aspects of the networked local computer system of FIG. 1.

FIG. 2 is a functional block diagram of aspects of the computer system 100 of FIG. 1 in accordance with some embodiments. Other system configurations can readily be used so that FIG. 2 is merely illustrative of one possible example and is not limiting to the scope of the disclosed subject matter. The system 100 includes a local system 114 that incorporates various hardware and software objects (resources) including applications, files, servers and available memory.

The local system 114 may also encompass a number of user computers 116 accessed by individual users. The user computers 116 may also have various hardware and software objects including applications, files, operating systems, client services, web browsers, memory, etc. A front end 118 may be used to provide a gateway to the network 106 and may include various conventional security features such as a firewall, anti-virus routines, etc. Conventional security features (e.g., anti-virus routines) may also be installed on the user computers 116.

In accordance with various embodiments, the system 100 further includes a security system 120. Main elements of the security system 120 represented in FIG. 2 include a security controller 122 and a decoy environment 124. The security controller 122 may be realized as one or more routines executed by an existing system computer such as the computer 104, or a separate computer may be provided for this purpose.

The decoy environment 124 can be realized (at least in part) in a portion of the computing memory space provided by the computing enclosures 110 or may be some other separate memory. It is contemplated that the data capacity of the decoy environment 124 may be relatively large, such as several TB or more. Various hardware and software resources may be incorporated into the decoy environment. In some cases, the security controller 122 is not be a stand-alone module but is instead incorporated as part of the environment 124.

The decoy environment 124 is operationally isolated from the local system 114 to reduce the likelihood of malicious routines executed within the environment infecting or otherwise gaining access to the local system 114. The decoy environment 124 and/or the security controller (engine) 122 may be run as a virtual environment, a separate physical environment, etc.

As explained below, the security system 120 operates to interdict and disrupt malicious payloads received from the outside world through the network 106. A sequence diagram in FIG. 3 generally illustrates operation of the system.

Beginning at the upper left hand portion of the diagram, a malicious payload is communicated to the system 100 by an attacker using an attacking computer ("attacker system") 126. The malicious payload can be transmitted in a variety of ways, including as a portion of code embedded within an email, a file, a web browser page, etc. The malicious code may be sent to the system 100 in an unsolicited communication or a solicited communication to one or more of the users of the local user computers 116 (FIG. 2).

It will be noted that normal blacklisting, white listing and/or anti-viral routines of the system may be incorporated as part of the system 120. Nevertheless, for purposes of discussion, it is contemplated that the payload escapes detection by such systems and is received by the front end 118 and received by one or more of the local computers 116. It is also contemplated, although not necessarily required, that the received payload is configured to generate a callback communication to the attacker system to allow the attacker to gain further access to the system.

The security controller 122 will detonate (e.g., open, activate, execute, interpret, etc.) the received payload within the decoy environment 124 multiple times, resulting in multiple decoy callbacks being generated and returned to the attacker system 126. Because the payload is received by one or more of the user computers 116, the user of the local user computer(s) 116 also may open, activate or otherwise execute the payload, generating an authentic callback or callbacks which is/are sent to the attacker system 126. Because the decoy environment 124 continues to open and execute the code for an extended period of time, it is contemplated that the authentic callback(s), if any, will be embedded within a significantly larger population of decoy callbacks. The ratio of decoy callbacks to authentic callbacks can vary, but ratios of 1000:1 or more are envisioned in some cases. The timing and spacing of the decoy callbacks can be randomized to avoid the easy detection of a pattern and filtering out of the decoy callbacks.

Figure 3:
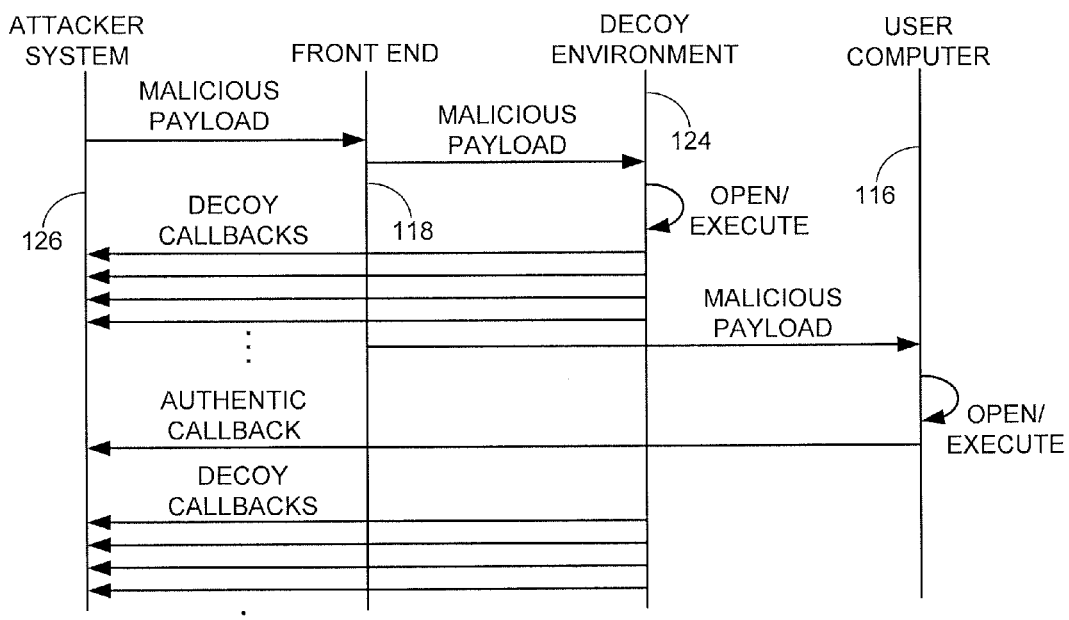
FIG. 3 is a sequence diagram illustrating operation of the diagram of FIG. 2.
Figure 4:
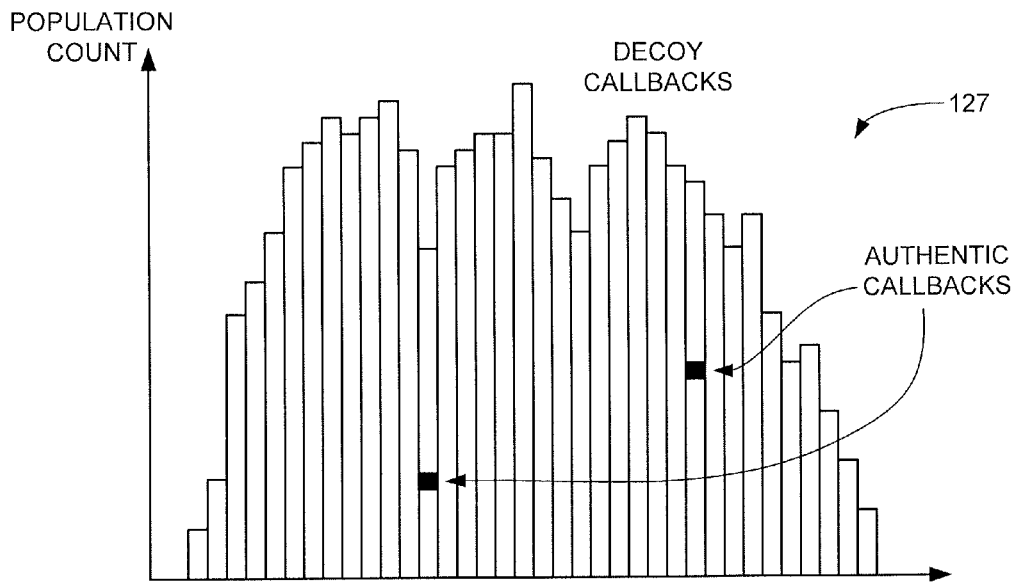
FIG. 4 is a histogram showing a population of decoy and authentic callbacks generated by the sequence of FIG. 3.

FIG. 4 is a histogram 127 of callbacks generated by the timing sequence of FIG. 3 over an elapsed time period. The elapsed time period can vary from a few minutes to several days or more, depending on the requirements of a given application. As can be seen from the histogram 127, the vast majority of the callbacks are decoy callbacks, and only a few (in this case, two) callbacks are authentic callbacks. The authentic callbacks are masked within the larger population of decoy callbacks.

The number and rate of decoy callbacks is not constant, but rather follows a predetermined time-varying profile. The profile can take any suitable form including Gaussian, bi-modal, etc. In some cases, random number generators or other mechanisms are used to provide a time-varying, pseudo-random or random response with regard to the numbers and types of callbacks generated for a given time interval.

It will be appreciated that if a large number of callbacks were provided all at once, the attacking system could potentially detect and filter out such decoy callbacks. On the other hand, in some cases it may be desirable to provide a relatively large number of concurrent detonations (and associated decoy callbacks), alone or in combination with detonations that take place in succession at a time varying rate over an applicable period of time (to provide a sequence of decoy callbacks over time). By spreading out the decoy callbacks in a time varying fashion, including an apparent random fashion, the detonation schedule may mimic user operations, and locating an authentic callback within the sea of noise provided by the overall population of callbacks becomes significantly harder.

It will be appreciated that the attacker system 126 from FIG. 3 receives a large volume of callbacks, all of which may have the same IP address (or other target identifier information) and all of which may appear to be valid callbacks. Attempts to exploit the callbacks may be fruitless since, from a probability standpoint, it is likely that the attacker will not be able to immediately distinguish between the authentic callback(s) from the decoy callbacks. Thus, after several attempts to unsuccessfully gain access to the system by processing a first number of the received callbacks, it is contemplated that the attacker will likely abandon the attack and move to a different, less defended target.

The time frame during which the decoy callbacks are generated can vary. The time frame can last from as little as a few minutes to several days (or weeks or more). The frequency (e.g., number of callbacks/unit time) can also be adjusted from a relatively infrequent rate to a highly frequent rate. This can also vary over time to avoid filtering efforts at the attacker system level.

Should the security system 120 detect the decoy callbacks are being generated responsive to the execution of a malicious payload portion of the payload, system administrative personnel can remove or otherwise quarantine the payload from the user computers 116, thereby reducing the incidence of subsequent execution by the local users and the generation of authentic callbacks. The decoy callbacks can continue to be generated until a specified time interval is concluded, or can continue in a continuous or intermittent fashion until manually disabled using user input. Over time, the "signature" of the callbacks can vary to further disrupt the attacking party and mask the source thereof. Care may be taken to ensure the callbacks do not rise to the level of impermissible "attacks" themselves that violate local rules or regulations.

The manner in which malicious code is opened, executed, interpreted or otherwise activated can vary depending on the type of attack. For example, a word processing document may be opened by launching an associated word processing application (e.g., Microsoft®Word®, etc.), opening the file, closing the application, and repeating numerous times (e.g., several hundreds or thousands of times). In some cases, the application may remain running and the file is opened, closed, reopened, etc. multiple times.

If the received payload is an email, the email may have an attachment, embedded code (e.g., JavaScript® language), an embedded hyperlink, etc. The decoy environment can be configured such that these and other aspects of the received email can be denoted using various email applications, web browsers, etc. If the received payload is a web page, the page may be similarly opened multiple times by a web browser application (e.g., Google®Chrome®, Microsoft® Internet Explorer®, etc.). Similar actions can be taken for images, videos, spreadsheets, presentations, graphics files, zipped files, executable files, interpretable files, markup language code, memory streams, etc. as well as substantially any other type of received payload.

In some cases, the payload may be a file or a memory stream and may be detonated using a host application or an interpreter. Generally, a file may be characterized as a set of data that is loaded from storage to memory for an operation thereon, and a memory stream may be characterized as a set of data that is written directly into memory. A host application may be used to open or otherwise activate a loaded file, and an interpreter is a module (e.g., Java®, .NET Common Language Runtime, etc.) that interprets code dynamically.

A short delay can be invoked to enable the decoy environment 124 to initiate detonation of the received payload one or more times prior to forwarding the payload to the end user(s). In other cases, the security system 120 monitors and copies over all payloads that are otherwise directed through the system 100.

A feature of the example system 120 is that every received payload is subjected to decoy environment processing. That is, in some embodiments the decoy environment 124 is normally configured to detonate all payloads received by the system 100 irrespective of type, source and intended recipient. For example, every single email (whether having an attachment or not) is directed to the decoy environment 124 and opened multiple times. Similarly, every accessed web page, every application file, every executable code module, etc. can be directed to the decoy environment 124 for detonation prior to or concurrent with routing to the intended recipient. In this way, there is no need to screen or otherwise analyze incoming communications; if any malicious code is present that generates a callback upon activation, the callback(s) will be automatically triggered by the system. Depending on the size and data I/O requirements of the system 100, the security controller 122 may be realized in the form of one or more dedicated, high power computers in order to ensure sufficient capacity to handle peak loading levels.

In other cases, the security system 120 can monitor and adapt itself, or follow establish rules, so that some types of communications are subjected to repetitive detonation by the decoy environment 124 and others are not. For example, payloads without attachments or embedded hyperlinks, and/or payloads from trusted sites, may be exempted from security processing if it is determined that there is little risk of malicious code being transferred through such payloads.

Figure 5:
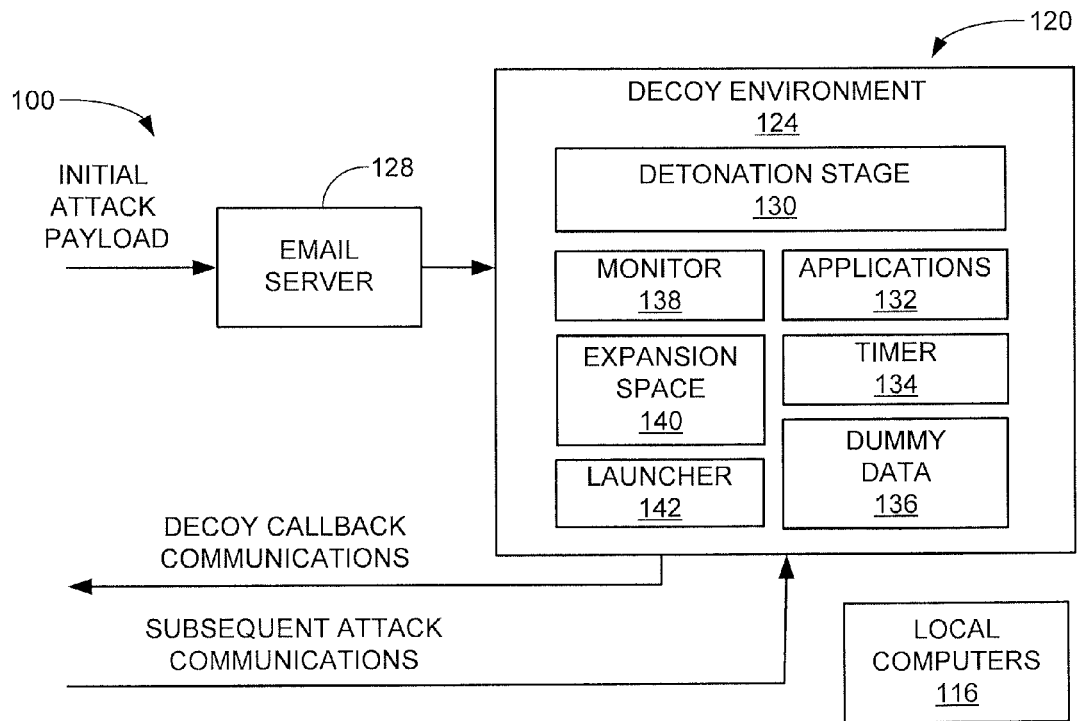
FIG. 5 is another functional block diagram of the networked local computer system in accordance with some embodiments.

FIG. 5 provides a functional block diagram of the system 100 in accordance with some embodiments. In FIG. 5, the system is configured to evaluate an incoming email message (payload), although it will be appreciated that the system can be readily configured to concurrently evaluate other forms of received payloads as well.

An email server is represented at 128 and forms a portion of the local system 114 (FIG. 2). The email server 128 receives all incoming email communications, including a selected email payload having a malicious component. The malicious component of the received payload is designed to be opened, and to send back a small callback communication that establishes a back door or other access point for an attacker system. This allows the attacking party to follow up with a subsequent attack to obtain copies of files, to wreak havoc by destroying data, to send additional malicious code, etc.

Figure 6:
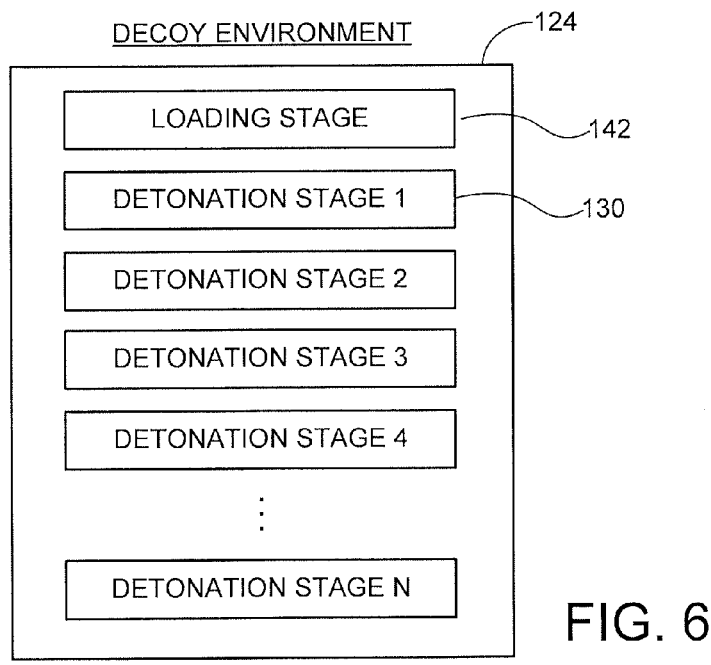
FIG. 6 is a functional representation of the decoy environment of FIG. 5 in accordance with some embodiments.

As shown in FIG. 5, the decoy environment 124 includes at least one detonation stage 130. Generally, it is contemplated that the decoy environment 124 will incorporate a large number of detonation stages 130 which operate in parallel to individually detonate different copies of the received payload, as generally represented in FIG. 6. The operation of only one of these stages 130 will be discussed in conjunction with FIG. 5.

Each detonation stage 130 can incorporate and/or utilize various hardware and software elements (resources) including software applications 132, a timer 134, dummy data 136, a monitoring module 138, expansion space 140 and a launcher module 142. Other configurations can be used. Some of the elements can be realized as programmable routines executed by the security controller 122.

The applications 132 can be copies of all applications otherwise normally resident on the user computers 116. The timer 134 can be used to establish appropriate times at which to open the received email (or other payload). The dummy data 136 can be false data for misinformation purposes. The monitoring module 138 can monitor the results of the opening of each received communication. The expansion space 140 can be used to provide room to accommodate the multiple openings of the communications. The launcher module 142 can operate to execute the various applications 132 to launch/open/activate the various payloads. Other modules are envisioned as well, such as detection modules that monitor for subsequent communications from sources associated with detected malicious content, etc.

The decoy callback communications may be configured to purposefully allow a backdoor be opened into the decoy environment 124, so that during a subsequent attack communication, the attacker may attempt to access the dummy data 136. The dummy data 136 can be provided with file names such as "Upcoming Acquisitions.xls," etc. to entice selection and copying. Fake registries, operating system files and other data structures can be provided in the dummy data 136. The monitoring module 138 can monitor these structures to see if the malicious code attempts to copy, modify, attach itself to or otherwise affect these structures. It is contemplated that the decoy environment 124 will be configured to detect unauthorized accesses thereto, allowing the system administrative personnel to take appropriate actions. In some cases, communications may be sent back to the attacking party in an effort to gain further information regarding the status and configuration of the attacking system.

By definition, malicious code routines that generate callbacks are often designed to be substantially undetectable by normal system monitoring mechanisms. By repetitively activating a particular communication with a callback routine, sufficient repetitive traffic may be easily and quickly identified, even if the outgoing traffic itself (e.g., a small packet or two) appears to be innocuous. For example, a localized increase in network outgoing traffic resulting from the repetitive opening of a particular communication can enable identification of a malicious payload, allowing system personnel to focus further investigational efforts upon that communication. In some cases, if the monitoring module 138 does not detect the generation of any callbacks after multiple opening/execution operations, further processing may be aborted. This can reduce the system loading to concentrate on those communications that appear to be generating callbacks.

Where applicable and allowed via regulatory rules and regulations, the callback communications, once detected, allow offensive techniques to be implemented. One offensive technique involves sending one or more malicious payloads back to the attacker to further disrupt the attacking operation. Care should be taken to avoid inadvertent communications in situations where the generated callbacks are proper, such as in the case of requests for advertisements on web pages, etc. For example, some web pages include third party advertising content, and the loading of a web page onto a local computer includes a callback to request an ad or other specially configured content which is displayed in an ad slot on the computer display. Such callbacks are entirely appropriate and should be allowed without disruption.

In some cases, the security system 120 can develop and/or implement rules to detect and discard/interrupt the sending of callbacks that are properly generated. For example, the system might block the transmission of decoy callbacks known to be generated for a valid purpose. Whitelisting of trusted sites can be used to reduce false alarms.

The launcher 142 can provide a launching schedule in accordance with a predetermined callback profile, such as illustrated in FIG. 4. As will be appreciated, computer systems are often arranged to allow a user to manually launch applications such as 132 by user interaction with an application interface (API), such as by clicking on an icon on a display, etc. The launcher 142 can be configured to automate this process by providing a batch type file or other data structure that induces the automated launching of the various applications and the opening of the associated communications (files, etc.). In some cases, the launcher 142 may include a random number generator to provide a random time delay between successive detonations of the payload.

Other mechanisms can be used to provide the requisite time delay between activations, such as a lookup table with non-uniform time delays provided therein. For example, a loading stage 144 (FIG. 6) can be used to store a pristine copy of the received payload and to distribute copies of the payload to the various detonation stages in turn.

In cases involving phishing (e.g., efforts to get users to visit a counterfeit webpage or other location and enter personal information), the system can be adapted to automatically insert invalid and/or misleading data in such locations. Thus, as used herein, a malicious component can be any content in a received payload which either automatically, or via user input, generates a callback for malicious purposes. An embedded URL or other link in an email to a counterfeit site, for example, would be included in the context of a malicious code. Hence, in further embodiments, the decoy environment may be configured to automatically detect and activate embedded URLs, applications, links, buttons, interpretable files, executable code, markup language, script language, or other routines. Filtering can be used to detect advertisements or other legitimate offers that should not be subjected to multiple activations.

As set forth by the arrangement of FIG. 6, each detonation stage 130 is configured and used to perform a single detonation of a different copy of the received payload. FIG. 6 illustrates a total of N detonation stages, which will result in N detonations and, in the case where malicious content is present, the generation of N decoy callbacks.

Each of the detonation stages 130 can be nominally identical. However, in some embodiments at least some of the detonation stages 130 are provided with different configurations. For example, the stages may, via virtual machine techniques, emulate different operating systems, different web browsers, use different email management programs, may use different versions and sources of application programs, use different time/date stamps, different system configurations, etc.

In this way, malicious content configured to react differently under different environmental conditions can be activated. For example, malicious payloads that attack a particular weakness of a particular web browser may only generate decoy callbacks (or take other malicious actions) in those stages that emulate that particular web browser. Monitoring modules can be used to detect which stages are found to cause a "response" by the detonation of the payload, and appropriate corrective actions can be taken, such as by generating new local detonation stages to repeat the activation of the detected response.

Another feature of the use of individual detonation stages 130 is that this may make it easier to defeat defensive capabilities of the malicious payload and/or attacking party. For example, the malicious payload may be configured to track the number of activations of a given copy of the received communication in an effort to prevent multiple callbacks being generated in succession. By only opening each copy once, any internal counters or other mechanisms in the payload will not register multiple activations, and so it may be harder for the attacking party to easily detect and circumvent the defensive system being employed against it.

Finally, the arrangement of FIGS. 5-6 can be used in such a way that some detonation stages 130 only open a given copy once and other stages open the payload multiple times. This can be used to further detect delay-activation code that may be configured to require multiple activations before malicious actions are taken upon the system.

As part of the processing of FIGS. 5-6, other steps may be taken as well, such as opening other applications in the presence of the activation of a first application. This will help to detect multi-application "trigger" events; for example, a malicious payload embedded in an email may operate in conjunction with an open web browser, etc. Various combinations of applications and environments can be used in an effort to purposefully detonate a malicious payload, if one is present, under a variety of different possible environments.

Figure 7:
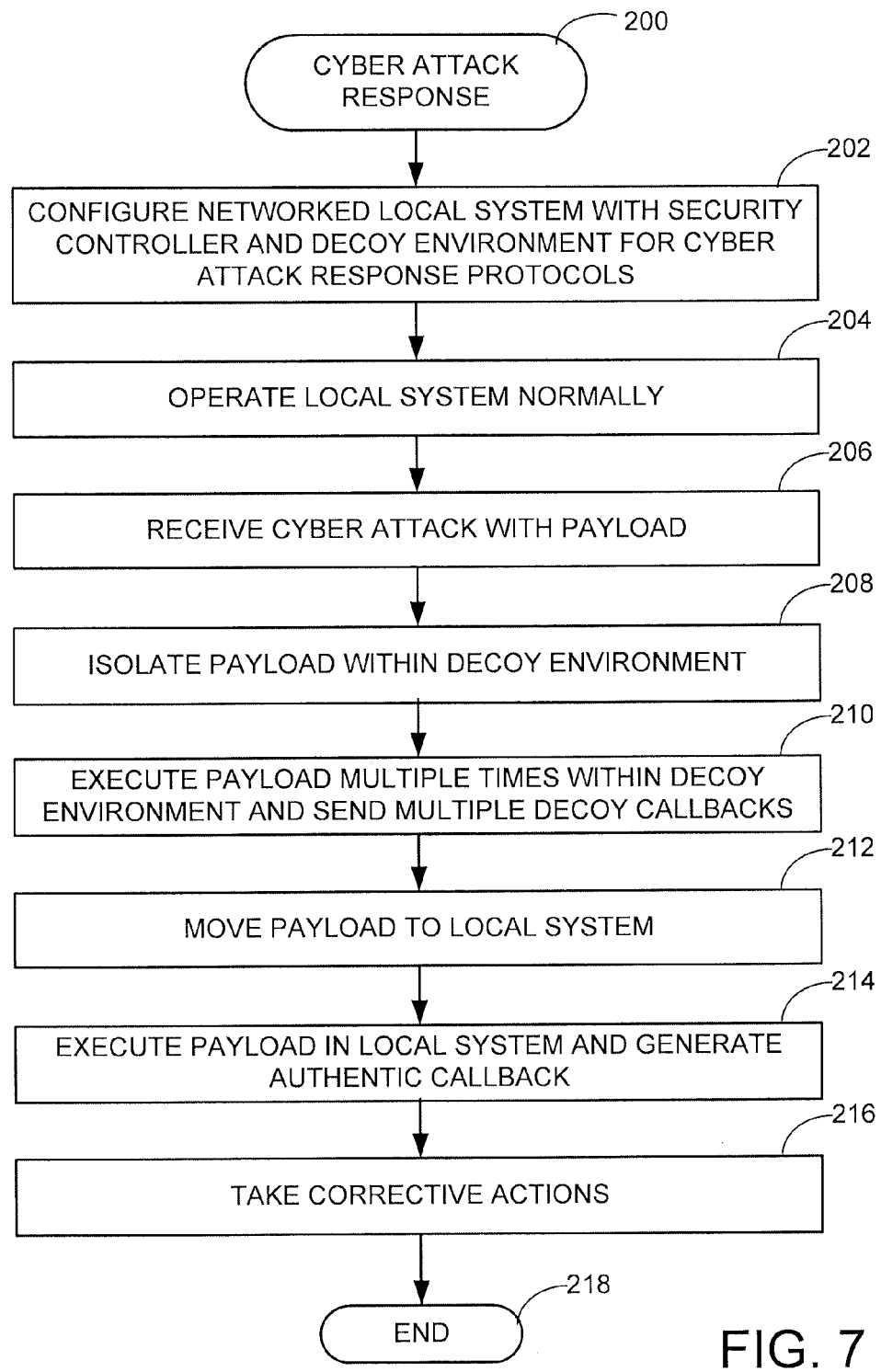
FIG. 7 is a flow chart illustrating steps carried out in accordance with some embodiments.

FIG. 7 provides a flow chart for a CYBER ATTACK RESPONSE routine 200 illustrative of steps that may be carried out in accordance with some embodiments. A networked local system, such as 100, is initially configured at step 202 to have various elements such as local user computers 116, a centralized computing assembly 102, a local server 104, etc. (see FIG. 1). In addition, the system 100 is configured to include a cyber security system, such as 120, having a security controller 122 and a decoy environment 124. It will be appreciated that FIG. 7 is merely exemplary and the various steps shown in the routine 200 can be omitted, modified, performed in a different order, and other steps not present in FIG. 7 can be carried out as discussed herein.

The system 100 is operated normally at step 204, which will include operations that may involve communications between the system 100 and remote devices over a network such as 104 (FIG. 1).

At some point a cyber attack involving a received payload is experienced, as indicated at step 206. The payload is isolated within the decoy environment at step 208, and detonated multiple times at step 210 to generate and send multiple decoy callbacks to the attacker, as discussed above in FIG. 3. The payload may be received by one or more local computers 116 at step 212, where the local users execute the payload and generate one or more authentic callbacks which are also forwarded to the attacking system at step 214.

As discussed above, the relatively large volume of decoy callbacks will effectively mask the authentic callback(s), reducing the ability of the attacker to exploit the authentic callback(s). Corrective actions may be taken as desired at step 216, and the routine thereafter ends at step 218. It will be appreciated that the malicious payload may not necessarily generate a callback but rather take other malicious actions (attempt to modify registers, corrupt data, etc.). Such will also be detected and defeated during the routine of FIG. 7 as well.

It will now be appreciated that the various embodiments set forth herein can provide a number of benefits. The use of an isolated decoy environment 124 can allow activation of all payloads received by the system 100. The detonation (e.g., opening, executing, interpreting, launching, etc.) of the received payloads can be monitored to see what happens, if anything, in a safe and controlled environment. Any malicious code operations, including the generation of callbacks, can be detected and interdicted by "detonating" the code in an isolated detonation stage. In some cases, after activating a received payload a number of times without the detection of any adverse effects, further activation can be aborted and the payload can be marked as "safe" for use by the local users.

In some cases, substantially every payload received from the outside world is subjected to the decoy environment processing. In other cases, only selected communications are subjected to the decoy environment processing. While the various embodiments disclosed herein are directed to evaluation of networked communications, in other embodiments it is contemplated that files transferred through other means, such as via thumb drives or other portable media, can also be subjected to like processing. Logistically, it may be necessary to configure such systems to receive copies of all externally received files and direct such to the decoy environment for "virtual" processing.

Depending on the depth of defense, the decoy environment can be configured to emulate a variety of operational environments and conditions. For example, the decoy environment may be set up to concurrently emulate different operating systems, such as Microsoft® Windows®, Linux®, Apple® OS X®, etc. The decoy environment may further be configured to reset certain system parameters such as different date/time stamps in an effort to identify malicious code that is activated at a particular future time. While it is contemplated that each received payload will be copied to the decoy environment and that same copy of the payload will be repetitively detonated, in other embodiments, multiple copies can be made and each one detonated in turn using different detonation stages. Substantially any detonation strategy can be employed to evaluate and initiate the triggering of malicious routines, including strategies that adapt over time.

In further cases, payloads that are found to generate malicious callbacks can be identified for future reference and screening. Such payloads can also be promulgated in a list so that other users of similar security systems can be alerted and take corrective actions.

Any number of different types of systems can incorporate the subject matter disclosed herein. In some cases, a single desktop user (such as a home computer, etc.) can utilize the decoy environment to open the payloads multiple times prior to or concurrently with the opening of the payloads using local application software. Thus, the same processor can be used concurrently to execute both local system processing functions and the decoy environment functions.

It is to be understood that even though numerous characteristics and advantages of various embodiments of the present disclosure have been set forth in the foregoing description, together with details of the structure and function of various embodiments disclosed, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
using a local network accessible system to receive a payload transmitted across a computer network, the local network accessible system comprising a processor, an associated memory and a decoy environment;
copying the received payload to the decoy environment and to the associated memory; and
repetitively detonating, within the decoy environment, the copied payload a plurality of times while concurrently activating, within the associated memory, the copied payload at least once,
wherein the received payload includes a malicious component from an attacking party configured to carry out a malicious action responsive to activation of the payload,
wherein the malicious action is carried out responsive to both the detonating of the copied payload within the decoy environment and activating of the copied payload within the associated memory,
wherein the malicious action comprises generating a callback communication to the attacking party,
wherein the detonation of the copied payload in the decoy environment said plurality of times in succession generates a corresponding plurality of decoy callback communications that are transferred across the network to the attacking party,
wherein the activation of the copied payload in the associated memory generates at least one authentic callback communication that is transferred across the network to the attacking party during the continued transfer of said decoy callback communications so that the at least one authentic callback communication is masked within said decoy callback communications; and
wherein the copied payload is detonated within the decoy environment a plurality of times in succession at a time varying rate over an applicable period of time using a predefined profile so that a number of detonations is different for at least some successive elapsed time periods over the applicable period of time and the authentic callback communication is transferred during an intermediate one of the successive elapsed time periods.

2. The method of claim 1, wherein the received payload is an email message with an embedded hyperlink, the email message being concurrently transferred to both the associated memory for access by a user of the local network accessible system and to the decoy environment, and the multiple detonations comprise activation of the embedded hyperlink.

3. The method of claim 1, wherein every payload received by the local network accessible system over said network is concurrently transferred to the associated memory and to the decoy environment.

4. The method of claim 3, further comprising detecting the generation of the multiple decoy callback communications and, in response thereto, removing the received payload from the associated memory after the generation of the authentic callback communication to prevent the generation of additional authentic callback communications while continuing to generate the decoy callback communications.

5. The method of claim 1, wherein the received payload is an email message with an attachment, the detonation of the received payload comprising executing an application program in memory to open the attachment.

6. The method of claim 1, wherein the copying step comprises transferring the received payload is transferred to the decoy environment, initiating a short delay period, and transferring the received payload to the local computer system after the short delay period.

7. The method of claim 1, wherein the payload comprises an executable file or a memory stream.

8. The method of claim 1, wherein the payload comprises a file or memory stream associated with a host application or associated with an interpreter.

9. The method of claim 1, wherein the communication is repetitively detonated by being opened, executed or launched at least N times where N is a plural number.

10. The method of claim 1, wherein N is greater than or equal to 100.

11. The method of claim 1, wherein the predetermined profile nominally follows a Gaussian distribution.

12. The method of claim 1, wherein the predetermined profile is multi-modal so that a first succession of the elapsed time periods have successively increased numbers of transmitted decoy callback communications, a following second succession of the elapsed time periods have successively decreased numbers of transmitted decoy callback communications, and a following third succession of the elapsed time periods have successively increased numbers of transmitted decoy callback communications.

13. the method of claim 1, further comprising forming a plurality of detonation stages within the decoy environment and copying the received payload to each of the detonation stages.

14. The method of claim 13, further comprising using each of the detonation stages to detonate only a single copy of the received payload once.

15. The method of claim 13, wherein the plurality of detonation stages comprises a first detonation stage which emulates a first operating system and a second detonation stage which emulates a different, second operating system.

16. The method of claim 1, wherein the decoy environment comprises a plurality of detonation stages including a first detonation stage which activates a first copy of the received payload using a first application program and a different, second local detonation stage which activates a different, second copy of the received payload using a different, second application program.

17. A computer system comprising a processor, an associated memory and a decoy environment, the processor having associated programming to execute the following steps responsive to receipt of a payload transmitted across a computer network:
  copy the received payload to the decoy environment and to the associated memory; and
  repetitively detonate, within the decoy environment, the copied payload a plurality of times while concurrently activating, within the associated memory, the copied payload at least once, the received payload including a malicious component from an attacking party configured to carry out a malicious action responsive to activation of the payload, the malicious action carried out responsive to both the detonation of the copied payload within the decoy environment and the activation of the copied payload within the associated memory, the malicious action generating a callback communication to the attacking party, the detonation of the copied payload in the decoy environment said plurality of times in succession generating a corresponding plurality of decoy callback communications that are transferred across the network to the attacking party, the activation of the copied payload in the associated memory generating at least one authentic callback communication that is transferred across the network to the attacking party during the continued transfer of said decoy callback communications so that the at least one authentic callback communication is masked within said decoy callback communications, and the copied payload detonated within the decoy environment a plurality of times in succession at a time varying rate over an applicable period of time using a predefined profile so that a number of detonations is different for at least some successive elapsed time periods over the applicable period of time and the authentic callback communication is transferred during an intermediate one of the successive elapsed time periods.

18. The computer system of claim 17, the received payload comprising an email message with an embedded hyperlink, the email message transferred to the associated memory for access by a user of the computer system and to the decoy environment for detonation, the multiple detonations comprising activation of the embedded hyperlink multiple times.

19. The computer system of claim 17, the payload comprising an email message with an attachment, the email message and the attachment transferred to the associated memory for access by a user of the computer system and to the decoy environment for detonation, the multiple detonations comprising using an application program to open the attachment.

20. The computer system of claim 17, the processor directing a concurrent transfer of every payload received by the computer system over said to the associated memory and to the decoy environment.

21. The computer system of claim 17, the predetermined profile nominally following a Gaussian distribution.

22. The computer system of claim 17, the predetermined profile nominally following a multi-modal distribution.

23. the computer system of claim 17, the processor forming a plurality of detonation stages within the decoy environment and copying the received payload to each of the detonation stages.

24. A non-volatile, non-transitory computer readable medium on which is stored programming configured to, upon execution by a programmable processor, perform the following steps within a computer system:
  responsive to receipt of a payload transmitted across a computer network, copy the received payload to a decoy environment and to an associated memory; and
  repetitively detonate, within the decoy environment, the copied payload a plurality of times while concurrently activating, within the associated memory, the copied payload at least once, the received payload including a malicious component from an attacking party configured to carry out a malicious action responsive to activation of the payload, the malicious action carried out responsive to both the detonation of the copied payload within the decoy environment and the activation of the copied payload within the associated memory, the malicious action generating a callback communication to the attacking party, the detonation of the copied payload in the decoy environment said plurality of times in succession generating a corresponding plurality of decoy callback communications that are transferred across the network to the attacking party, the activation of the copied payload in the associated memory generating at least one authentic callback communication that is transferred across the network to the attacking party during the continued transfer of said decoy callback communications so that the at least one authentic callback communication is masked within said decoy callback communications, and the copied payload detonated within the decoy environment a plurality of times in succession at a time varying rate over an applicable period of time using a predefined profile so that a number of detonations is different for at least some successive elapsed time periods over the applicable period of time and the authentic callback communication is transferred during an intermediate one of the successive elapsed time periods.

25. The medium of claim 24, the payload comprising an executable file.

26. The medium of claim 24, the payload comprising a memory stream.

27. The medium of claim 24, the programming further configured to, upon execution of the programmable processor, detect the generation of the malicious callbacks and quarantine the copy of the payload in the memory to prevent further generation of authentic callbacks.

* * * * *